United States Patent [19]
Blažek et al.

[11] Patent Number: 5,755,456
[45] Date of Patent: May 26, 1998

[54] SPRING SUPPORT FOR VEHICLE SWING HALF-AXLES

[75] Inventors: Ladislav Blažek, Kopřivnice; Pavel Kutáč, Lichnov; Petr Staníček, Valašské Meziříci, all of Czechoslovakia

[73] Assignee: Tatra A.S., Koprivnice, Czechoslovakia

[21] Appl. No.: 652,927

[22] Filed: May 24, 1996

[30] Foreign Application Priority Data

Jun. 1, 1995 [CS] Czechoslovakia ............. 4033-95

[51] Int. Cl.⁶ .................................................. B60G 11/26
[52] U.S. Cl. ..................... 280/712; 280/711; 280/683; 180/358
[58] Field of Search ..................... 280/712, 711, 280/683, 698, 702, 678, 109, 110, 115, 113, 118, 120; 180/358

[56] References Cited

U.S. PATENT DOCUMENTS

| | | | |
|---|---|---|---|
| 2,920,903 | 1/1960 | Locker | 280/683 |
| 3,003,575 | 10/1961 | Nallinger | 280/712 X |
| 3,003,781 | 10/1961 | Black | 280/683 |
| 3,102,736 | 9/1963 | Uhlenhaut et al. | 180/358 X |
| 3,614,121 | 10/1971 | Wolf | 280/683 |

FOREIGN PATENT DOCUMENTS 0250588  7/1925  Italy ........................ 180/358

*Primary Examiner*—Christopher P. Ellis
*Attorney, Agent, or Firm*—Notaro & Michalos

[57] ABSTRACT

A spring support for a motor vehicle has a center tube frame with a backbone tube supported through a pair of spaced apart transverse beams, and a pair of final drive casings spaced apart and mounted to the center tube frame on the backbone tube. Pairs of half-axles are mounted for swinging motion on each final drive casing. Pairs of fluid springs are mounted between a bracket connected to the backbone tube and each half-axle by seats provided on each bracket engaged with the fluid spring. Each seat is oriented to form an acute angle with a vertical axis symmetry plane of the center tube frame. Inclined rigid struts having an upper portion and a foot portion connect each fluid spring, to the corresponding half-axle. An embodiment in which two pairs of half-axles are supported on the center tube frame by fluid springs and a mechanical spring connected at a spring center to each side of the central tube frame further supports one half-axle of each pair of half-axles is also provided.

6 Claims, 4 Drawing Sheets

5,755,456

SPRING SUPPORT FOR VEHICLE SWING HALF-AXLES

The invention relates to a spring support for vehicle swing half-axles, especially that of transport vehicles, mounted for swinging motion on the backbone tube of the center tube frame.

DESCRIPTION OF PRIOR ART

The spring support for swing half-axles of the conventional motor vehicles with a center tube frame designed substantially for off-road transport are mostly equipped with mechanical springs rather than with independent fluid springs. The Czech Utility Model No. 1455 discloses a spring support where the mechanical spring support for a couple of half-axles arranged in series is combined with an adjustable air sprig disposed vertically between the side beam of the auxiliary vehicle frame and the front part of a longitudinally situated half elliptic leaf spring whose central part is coupled with the first swing half axle and whose rear part is coupled with a front end of a rocker level mounted for swinging motion on the vehicle frame the rear end of the rocker level being attached to the second swing half-axle.

Such an air spring support has certain disadvantages since it may be damaged when operating off road due to its low ground clearance as well as due to an additional bending stress applied to the side beam of the auxiliary frame which carries the seat for the upper side of the adjustable air spring.

SUMMARY OF THE INVENTION

The above disadvantages are substantially overcome by a spring support for a motor vehicle swing half-axles mounted for swinging motion on the backbone tube of the center tube frame comprised of tubular members mutually connected by at least final drive casings where the essential features of the invention are that the upper end of a fluid spring engages a seat of a bracket fixed to a backbone tube and the seat plane and the vertical longitudinal central symmetry plane of the central tube frame forms a sharp angel the lower front side of the fluid spring being coupled with the head portion of an inclined rigid strut whose foot portion is attached to the swing half-axle.

In order to reduce to a minimum the radial stress to which the fluid spring is exposed, it is advantageous if the central transversal symmetry plane of the fluid spring substantially crosses the axis of rotation of the swing half-axle at least when the axle takes its unsprung position.

With respect to the medium loading capacity vehicles it is advantageous if the fluid spring is completed with an additional parallel acting mechanical spring.

A special advantage provides an arrangement where the additional mechanical spring is a coil spring and is arranged inside fluid bellows.

With respect to high loading capacity vehicles with a couple of axles arranged in series it has proved to be advantageous if both swing half-axles are mutually coupled by a common mechanical spring mounted on the transversal beam of the backbone tube.

Another advantage provides an arrangement where the foot portion of an inclined rigid strut projects to form a fork and the opposite foot end of the fork is provided with a bearing surface which engages an elastic stop attached to the frame and within the fork a C-shaped suspension clip is disposed whose upper rolling surface is held in contact with the swing half-axle and its lower rolling surface carries one end of a mechanical spring.

The spring support for the swing half-axles according to this invention reduces the risks of damage to the fluid spring during any off-road traveling since due to the inclined disposition of the fluid spring, where its upper front side engages the seat located above the backbone tube, the spring is situated in substantially higher position above the ground than with an arrangement with a vertically disposed fluid springs. Moreover the fluid spring according to invention is on its lower side protected by the backbone frame tube. Another advantage of the invention is that the forces generated by the fluid spring do not affect the frame by an inappropriate bending moment as it is in the case of vertically disposed fluid springs and moreover, the horizontal force components are mutually eliminated.

BRIEF DESCRIPTION OF DRAWINGS

The accompanying drawings illustrate one example of the embodiment according to the invention where.

DETAILED DESCRIPTION OF THE EMBODIMENT OF THE INVENTION

Figure 1:
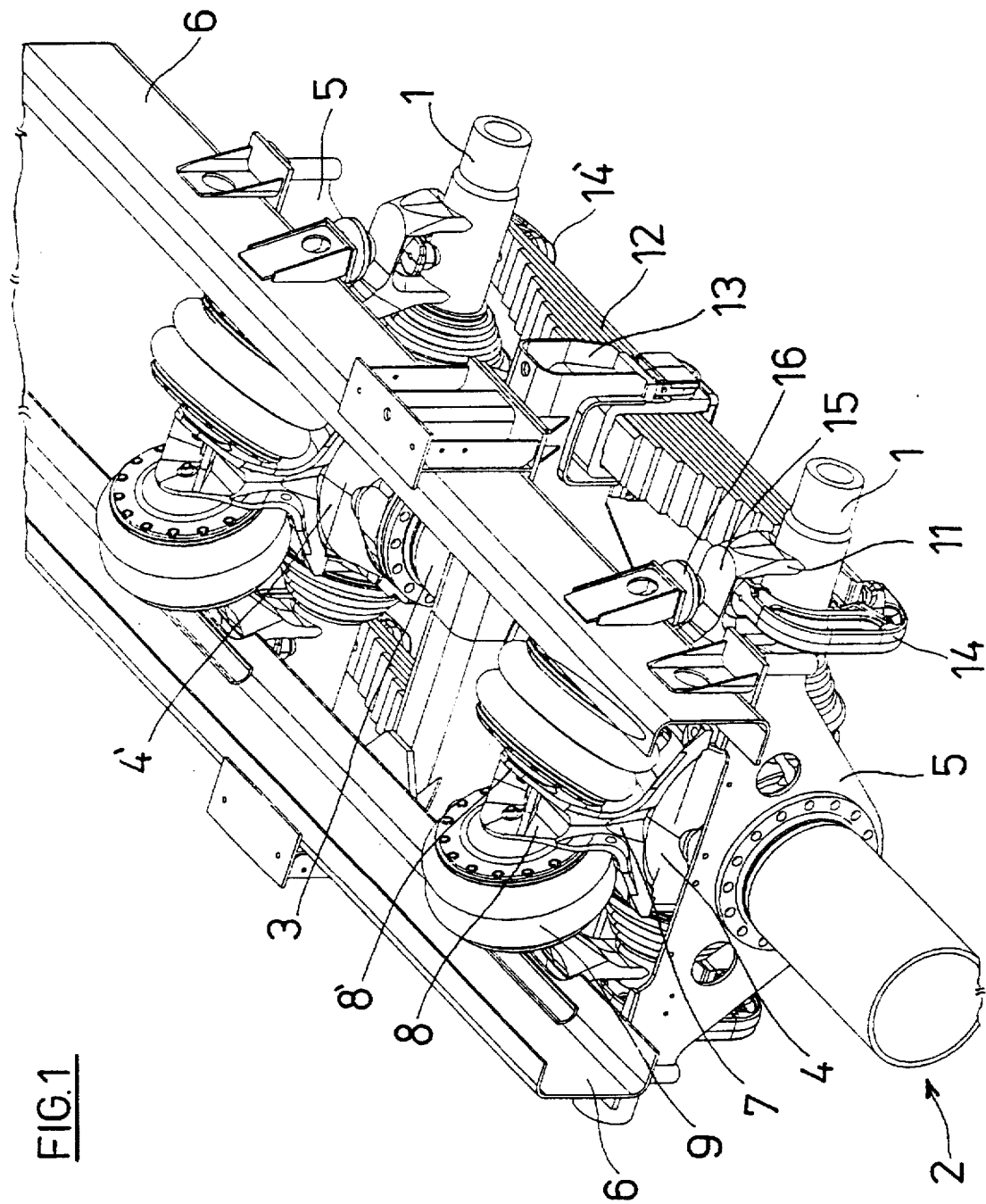
FIG. 1 is a perspective view of a spring support for a couple of axles arranged in series.
Figure 2:
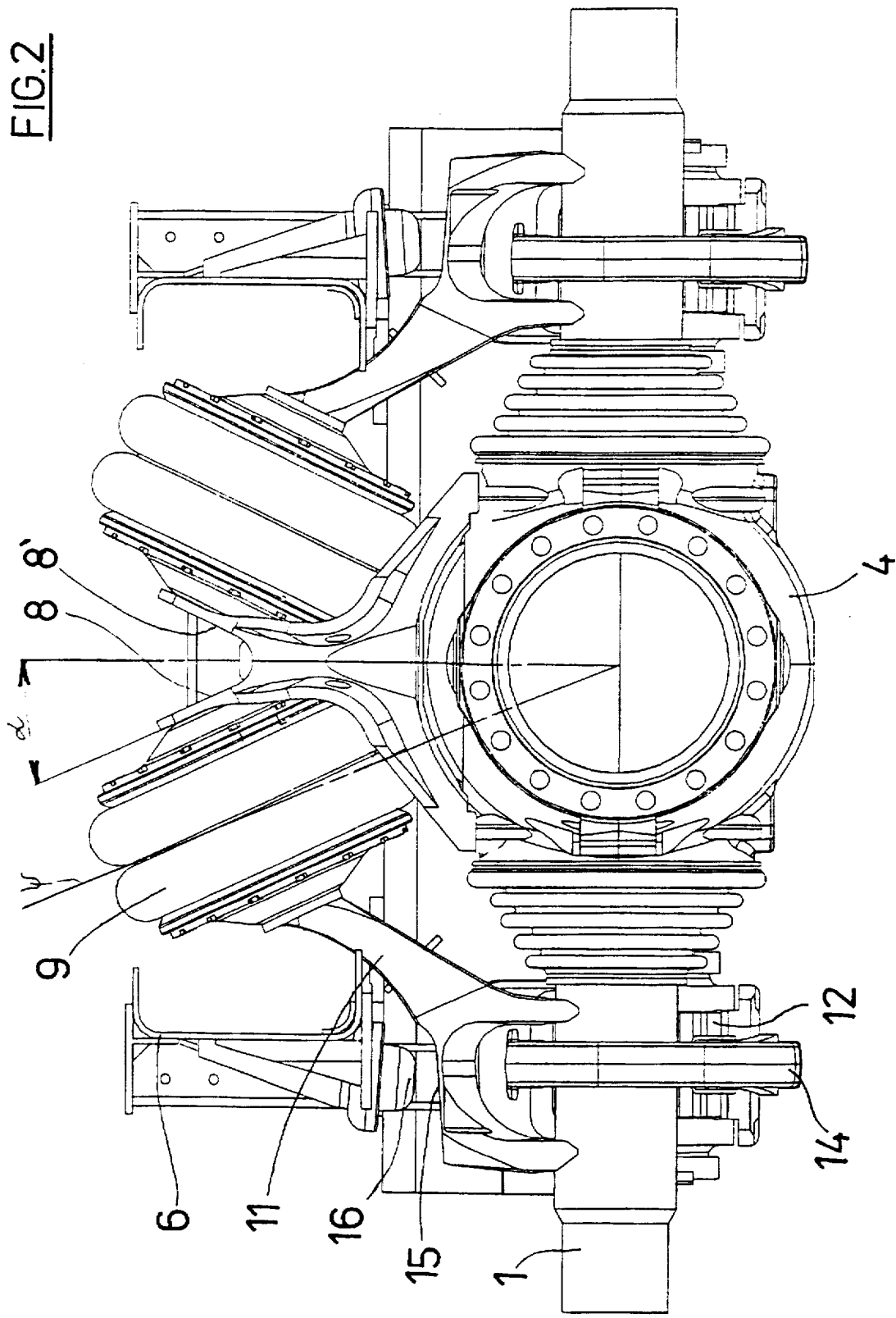
FIG. 2 is a rear elevation view of an axle spring support.
Figure 3:
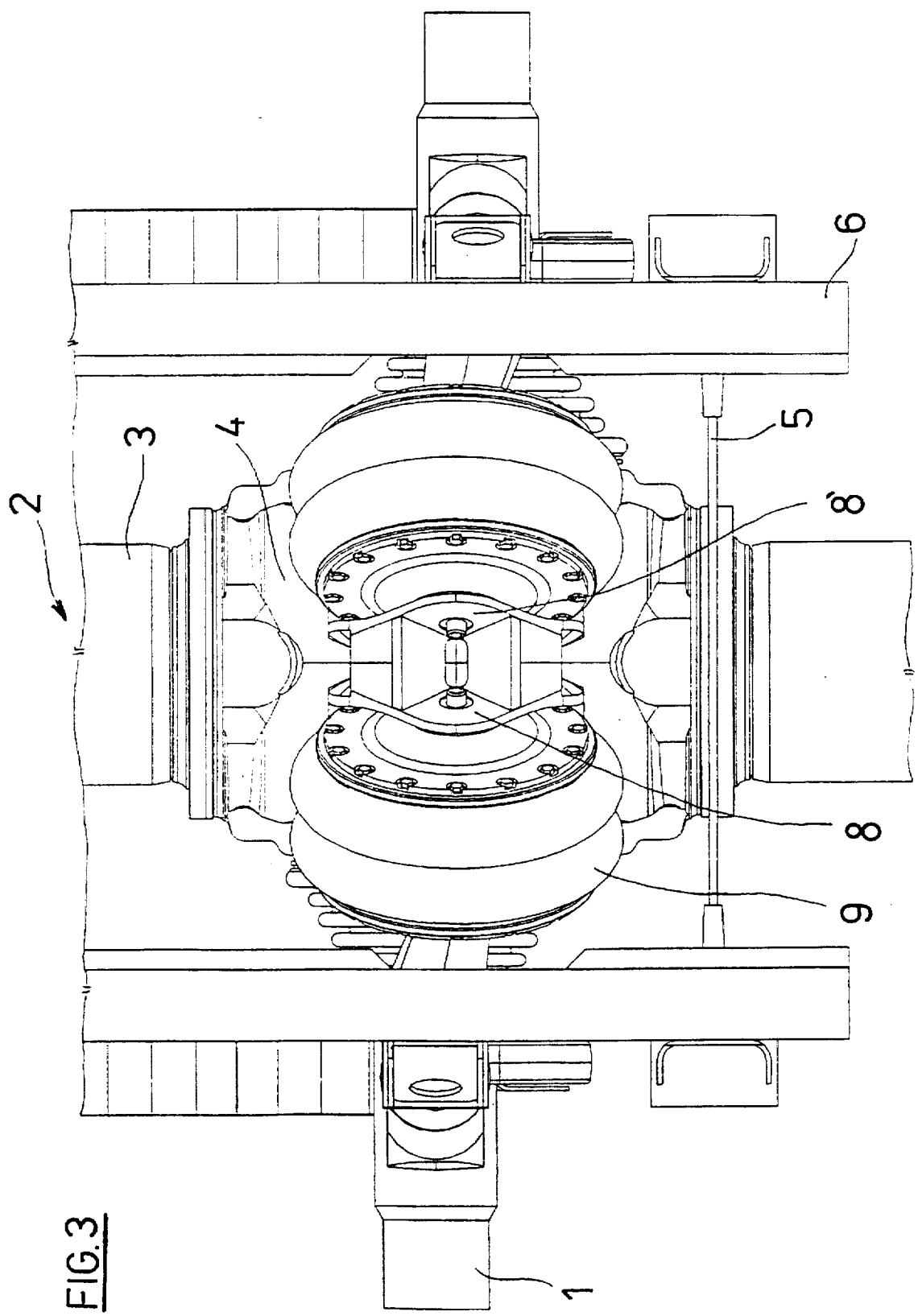
FIG. 3 is a plan view of an axle spring support.

As it can be seen from the accompanying drawings the swing half-axles 1, 1', are mounted for swinging motion on the frame backbone tube 2 comprised of tubular members 3 mutually connected by interim members such as final drive casings 4, 4', transversal beams 5 or a gearbox which is not shown in the respective Figure. To the transversal beam 5 side beams 6 of an auxiliary frame carrying the vehicle upper structure are attached. The swing half-axles 1, 1', are mounted for swinging motion on the final drive casings 4, 4', comprising wheel driving shafts not shown in the respective Figure which shafts oscillate around the axis O of the frame backbone tube 2. To the frame backbone tube 2, more specifically to the upper part of the final drive casing 4, a bracket 7 with two opposed reinforced seats 8,8', forming a sharp angel ∝ with the vertical plane of the center tube frame is attached. The seats 8, 8', engage the upper front sides of the fluid springs 9 of the axle. The fluid spring shown in this embodiment of the invention is an air spring connected to a (not illustrated) pressure air inlet and outlet through which the spring rigidity as well as the vehicle ground clearance may be adjusted. The lower front side of the fluid spring 9 is coupled in a disassembling manner with the upper part of the inclined rigid strut 11 whose foot portion is attached to the swing half-axle 2. The sharp angel ∝, the positioning of the bearing surface 8 and the inclination of the air spring 9 are so elected that the central transversal plane φ of the fluid spring 9 substantially crosses the axis O of the rotation of the swing half axle 1 at least when the swing axles 1 take their unsprung position in which their axes are parallel disposed.

Figure 4:
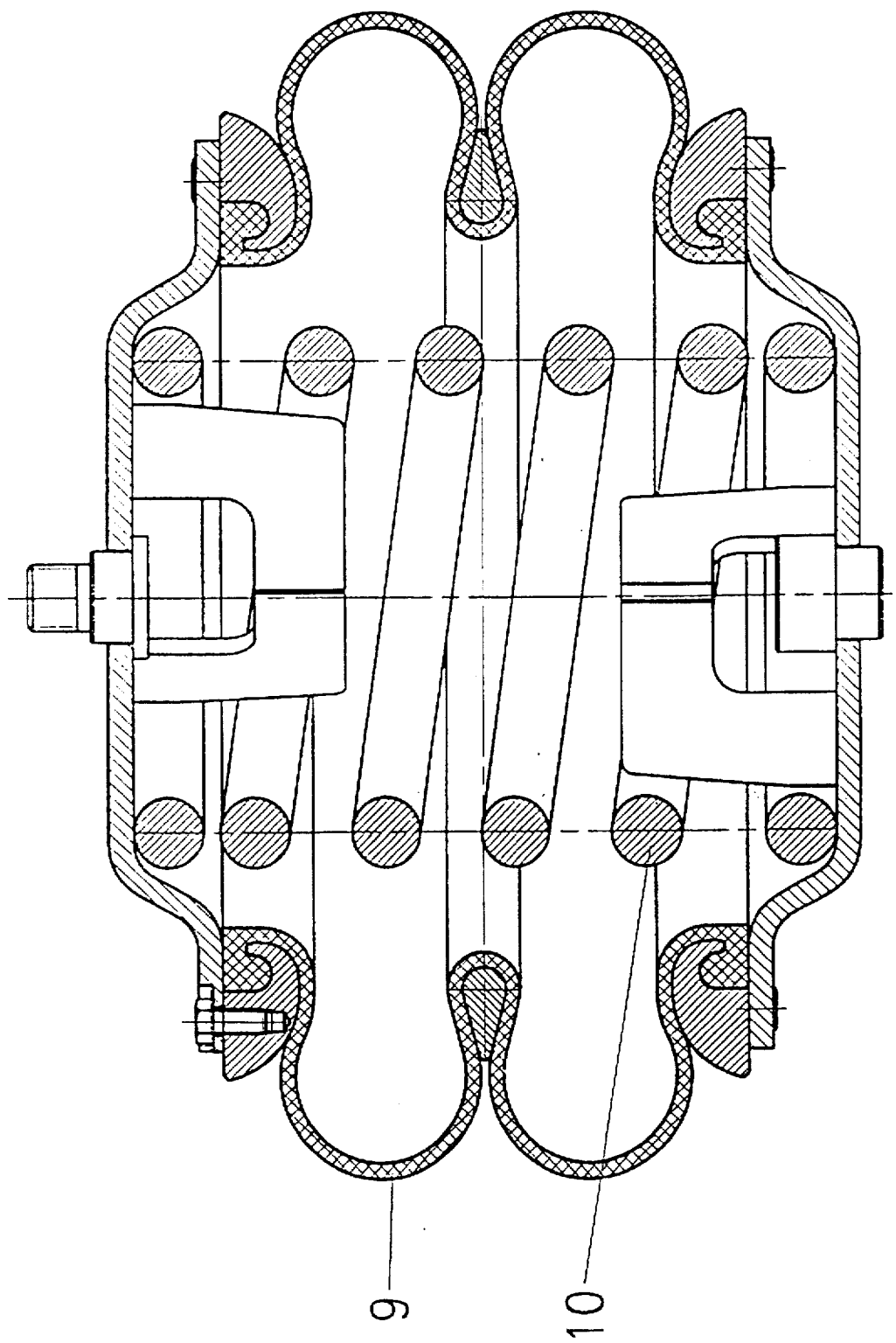
FIG. 4 is a partial longitudinal section of a fluid spring.

As to the medium load vehicles the fluid spring 9 may be completed by a parallel acting additional mechanical spring 10 such as a coil spring arranged inside the air spring 9 as is shown in FIG. 4.

The heavy load vehicles with a carrying capacity exceeding 11 tons may have the spring support of the couple of swing half-axles arranged in series completed by a mechanical spring 12 such as half-elliptic leaf spring attached at its center to the transversal beam 13 of the center tube frame while its end projections are coupled by means of suspension C-shaped clips 14, 14', with the swing half-axles 1, 1' respectively. In this embodiment the foot portion of the inclined rigid strut has a fork shape and the suspension clip 14 is located inside said fork. On the opposite side of the fork the foot portion of the inclined rigid strut includes a bearing surface 15 which engages the opposite elastic stop 16 provided on the side beam 6 of the auxiliary frame to limit the spring displacement upon heavy load strikes.

INDUSTRIAL APPLICABILITY

The spring support of the swing half-axles according to this invention may be incorporated in all road as well as off-road transport vehicles equipped with a central tube frame.

We claim:

1. A spring support for motor vehicle swing half-axles, the spring support comprising:

a center tube frame comprising a pair of spaced apart side beams connected by a pair of spaced apart transverse beams, a backbone tube supported through the pair of spaced apart transverse beams, the center tube frame having a central longitudinally-extending vertical axis symmetry plane;

at least one final drive casing mounted to the center tube frame on the backbone tube;

a pair of half-axles mounted for swinging motion on each at least one final drive casing;

a bracket connected to the backbone tube;

a pair of fluid springs, each spring having upper and lower front sides, each spring oriented between one of the pair of half-axles and the bracket;

a pair of seats provided on the bracket, each seat being engaged with the upper front side of one of the fluid springs of the pair of fluid springs, each seat being oriented to form an acute angle with the vertical axis symmetry plane of the center tube frame;

a pair of inclined rigid struts, each rigid strut having an upper portion and a foot portion, each upper portion being connected to the lower front side of one of the pair of fluid springs, each foot portion being fixed to the corresponding one of the swing half-axles.

2. A spring support according to claim 1, wherein a transverse plane through the middle of one of the pair of fluid springs intersects the axis of rotation of the corresponding swing half-axle at least when the fluid spring and corresponding swing half-axle are in an unloaded position.

3. A spring support according to claim 1, further comprising a pair of mechanical springs, each mechanical spring oriented in parallel with each of the pair of fluid springs.

4. A spring support according to claim 3, wherein the pair of mechanical springs comprises a pair of coil springs, one coil spring positioned inside a spring bellows of each of the pair of fluid springs.

5. A spring support for motor vehicle swing half-axles, the spring support comprising:

a center tube frame comprising a pair of spaced apart side beams connected by a pair of spaced apart transverse beams, a backbone tube supported through the pair of spaced apart transverse beams, the center tube frame having a central longitudinally-extending vertical axis symmetry plane;

a pair of final drive casings spaced apart and mounted to the center tube frame on the backbone tube;

two pairs of half-axles, one pair of half-axles mounted for swinging motion on each final drive casing;

a pair of brackets connected to the backbone tube, one bracket corresponding to each pair of half-axles;

two pairs of fluid springs, each spring having an upper front side and a lower front side, each spring associated with and oriented between one half-axle and the corresponding bracket;

a pair of seats provided on each bracket, each seat being engaged with the upper front side of the associated fluid spring, each seat being oriented to form an acute angle with the vertical axis symmetry plane of the center tube frame;

two pairs of inclined rigid struts, each rigid strut having an upper portion and a foot portion, each upper portion being connected to the lower front side of one fluid spring, each foot portion being fixed to the corresponding one of the half-axles;

a pair of mechanical springs, each mechanical spring having a pair of end projections, each mechanical spring connected at a spring center to one side beam of the central tube frame, one half-axle of each pair of half-axles connected at the end projections of one pair of mechanical springs, the other half-axle of each pair of half-axles connected at the end projections of the other pair of mechanical springs.

6. A spring support according to claim 5, wherein each foot portion of each rigid strut is shaped as a fork having a pair of fork members, a channel being formed by the fork members, each foot portion having a bearing surface, and further comprising at least four C-shaped suspension clips, one suspension clip mounted within each channel for connecting each half-axle to one end projection, four elastic stops mounted to the pair of side beams, one elastic stop corresponding to the bearing surface of each foot portion, the elastic stops for engaging the bearing surfaces.

* * * * *